United States Patent [19]

Bunce et al.

[11] Patent Number: 4,464,699

[45] Date of Patent: Aug. 7, 1984

[54] SHOCK PROOF ADJUSTABLE LOW-LOSS CAPACITOR

[75] Inventors: Arthur Bunce, Cedar Grove, N.J.; John E. Johanson, deceased, late of Boonton, N.J., by Edna L. Johanson, executrix

[73] Assignee: Johanson Manufacturing Corporation, Boonton, N.J.

[21] Appl. No.: 390,804

[22] Filed: Jun. 22, 1982

[51] Int. Cl.³ .............................................. H01G 5/14
[52] U.S. Cl. ...................................... 361/296; 411/214
[58] Field of Search ................. 361/295, 296; 411/83, 411/214

[56] References Cited

U.S. PATENT DOCUMENTS

| Re. 30,406 | 9/1980 | Johanson | 361/296 |
| 107,704 | 9/1870 | Moorcroft | 411/214 X |
| 932,395 | 8/1909 | Kenney | 411/214 |
| 4,305,113 | 12/1981 | Shai | 361/296 |

Primary Examiner—Donald A. Griffin
Attorney, Agent, or Firm—Pennie & Edmonds

[57] ABSTRACT

Apparatus for an adjustable low-loss capacitor, which can withstand the application of high shock forces without a corresponding change in a preselected value of capacitance, is described. This capacitor has two sets of hollow cylindrical electrodes which are coaxially interleaved, with, more particularly, one set attached to a rotor unit and the other to a stator unit, all contained within a housing. The capacitance is varied by longitudinal, i.e., axial, movement of the rotor unit with respect to the stator unit. The rotor unit is threadedly inserted into a bushing. In addition, the rotor unit includes a frictional locking mechanism which comprises a threaded member which is inserted into a hole cut into the rotor unit and oriented substantially parallel to the center axis of the rotor. As this threaded member is turned, one portion of the rotor unit moves, with respect to another portion, in a longitudinal direction substantially parallel to a center axis of the rotor unit. Consequently, the frictional force exerted between individual mating thread surfaces of both the rotor unit and bushing increases. This, in turn, frictionally locks the position of the electrodes on the rotor unit, in any preselected position, relative to that of the electrodes attached to the stator unit.

25 Claims, 5 Drawing Figures

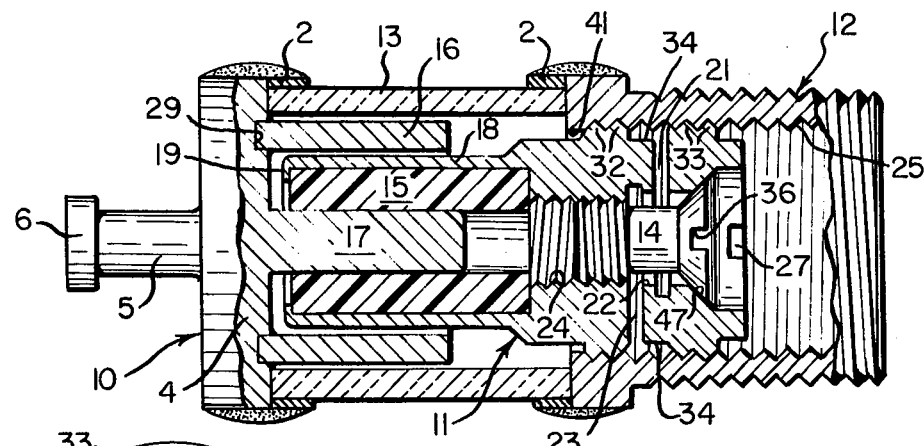
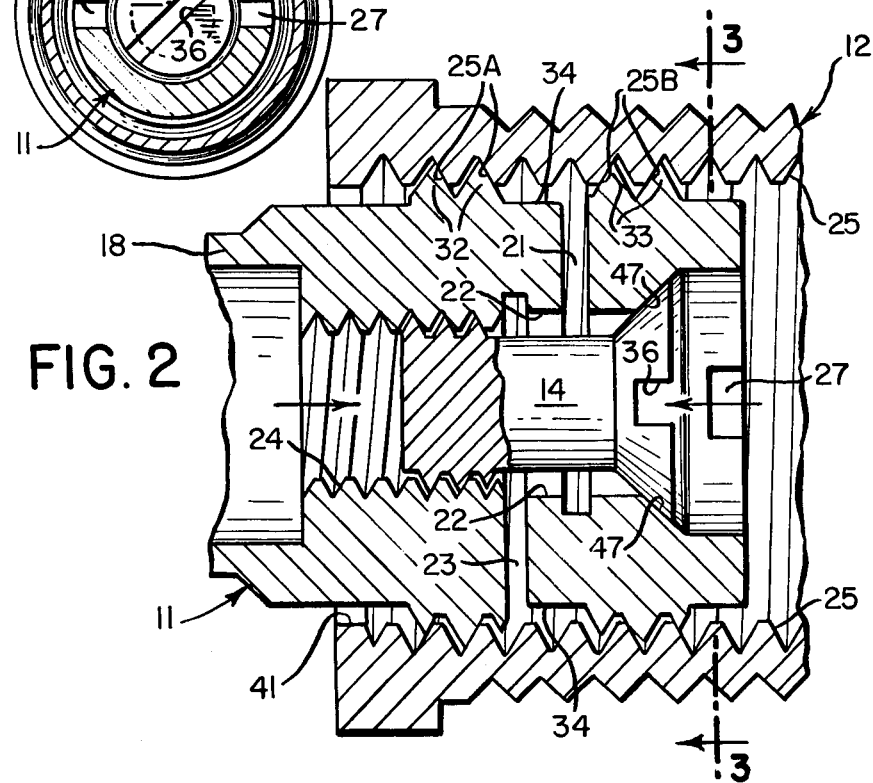

SHOCK PROOF ADJUSTABLE LOW-LOSS CAPACITOR

BACKGROUND OF THE INVENTION

1. Field of the Invention

This invention relates to variable capacitors and, more particularly, to an arrangement for an adjustable low-loss capacitor which can withstand high shock forces.

2. Description of the Prior Art

Adjustable or variable capacitors often find extensive use in electronic circuitry. Capacitors may be used to provide a tuning function or a trimming function. The latter is often required when unavoidable variations in the values of other components in an electronic system call for a capacitance value slightly different from that originally contemplated in order for the system to perform as designed.

One type of variable capacitor is that shown in U.S. Pat. No. 3,469,160 (issued Sept. 23, 1969 to J. E. Johanson) and reissued (on Sept. 16, 1980) as U.S. Pat. No. Re. 30,406. The capacitor described therein has a stator unit and a rotor unit, each comprised of an electrode having a series of coaxially arranged cylindrical conductive tubes. The tubes on the stator unit are rigidly connected by a hollow, insulating member to one end of a rotor bushing which has a series of internal threads. The rotor unit is comprised of an externally threaded screw with the rotor tubes mounted to one end, i.e. the electrode end, of the screw. The other end of the rotor unit, i.e. the adjustment end, has a slot into which an operator, for example, can insert an end of a screwdriver blade in order to turn the rotor unit and thereby adjust the capacitance. As the rotor unit is precisely threaded into the rotor bushing, the rotor tubes enter and become increasingly interleaved with the stator tubes. The resulting capacitance obtained with this arrangement is a linear function of the longitudinal, i.e., axial, displacement of the rotor unit and can be set with a high degree of precision to any value falling within the adjustment range. With this arrangement, maximum capacitances of between 5 to 500 pico-farads are commonly obtainable with an adjustment range of approximately 90% (or more) of the maximum capacitance.

To firmly hold the rotor unit in a desired position, added friction is imparted between each of the mating threads of the rotor unit and rotor bushing. This is readily accomplished by cutting two opposing slots into the rotor unit, and then pre-compressing these slots prior to threading the rotor unit into the rotor bushing, as shown and described in the previously noted U.S. Pat. No. Re. 30,406. A variant of this arrangement is shown in U.S. Pat. No. 4,305,113 (issued Dec. 8, 1981 to A. B. Shai) and involves the use of three slots whose inner edges are arranged to form an equilateral triangle about the center axis of the rotor unit.

Although the friction imparted to the mating threaded elements which secure the relative position of the rotor unit with respect to the stator unit in either of these devices is sufficient for most operating environments, it may be inadequate in an environment where the capacitor is subjected to high shock forces, for example, in excess of 25,000 g's. As a result, the actual capacitance is likely to deviate from the desired preselected value whenever a shock force of this magnitude is encountered. In fact, successive applications of a force of this magnitude could cause the actual value of the capacitance to depart significantly from the desired preselected value, thereby rendering the use of this capacitor unsuitable for such applications as ballistics, aircraft and space applications where shock forces of this magnitude are expected to occur.

SUMMARY OF THE INVENTION

Accordingly, it is an object of this invention to provide an adjustable, low-loss capacitor in which a preselected value of capacitance will not exhibit either transient or permanent change whenever the capacitor is subjected to a high shock force.

This object is achieved in accordance with this invention by inserting a threaded member into the rotor unit to cause one portion of the rotor unit to move, with respect to another portion, in a longitudinal direction substantially parallel to the center axis of the rotor unit so as to frictionally lock the position of the rotor in any preselected position. This member is oriented in a direction substantially parallel to the center axis of the rotor.

In accordance with a preferred embodiment disclosed herein, a hole is drilled partially through the rotor unit and substantially coaxial with the center axis of the rotor unit into which a threaded member, illustratively a screw, is then inserted. As the screw is turned, a longitudinally directed compressive force is imparted to both ends of the rotor unit as a result of the threads of the rotor bushing reacting to the corresponding mating threads of the rotor body. This force adds to the force produced by the slots cut into the rotor body. As a result, any friction exerted between mating thread surfaces of the rotor unit and the rotor bushing markedly increases. This advantageously constrains the motion of the rotor unit with respect to the stator unit and locks its position within the rotor bushing. Consequently, the position of the rotor unit becomes insensitive to the application of high shock forces from any direction.

In accordance with another preferred embodiment disclosed herein, a cylindrical member, having an adjustment slot cut in one end and threads positioned near that end, is inserted into the rotor unit in lieu of the screw. As this threaded member is turned, a longitudinally directed expansive force is imparted to both ends of the rotor unit as a result of the threads of the rotor bushing reacting to the corresponding mating threads of the rotor body. This force combines with that produced by the slots cut into the rotor body. As a result, any friction exerted between individual threads of the rotor unit and a surface of each of the corresponding mating threads of the rotor bushing markedly increases, thereby advantageously locking the position of the rotor unit with respect to the stator unit.

BRIEF DESCRIPTION OF THE DRAWING

The invention may be clearly understood from a consideration of the following detailed description and accompanying drawing in which:

FIG. 1 is a greatly magnified cross-sectional view of a preferred embodiment of an adjustable low-loss capacitor embodying the principles of this invention;

FIG. 2 is a magnified cross-sectional fragmentary view of the adjustable capacitor shown in FIG. 1, which more particularly, shows the adjustment end of the rotor engaged in the capacitor;

FIG. 3 is a reduced cross-sectional end view taken along lines 3—3, as shown in FIG. 2;

DETAILED DESCRIPTION

Figure 4:
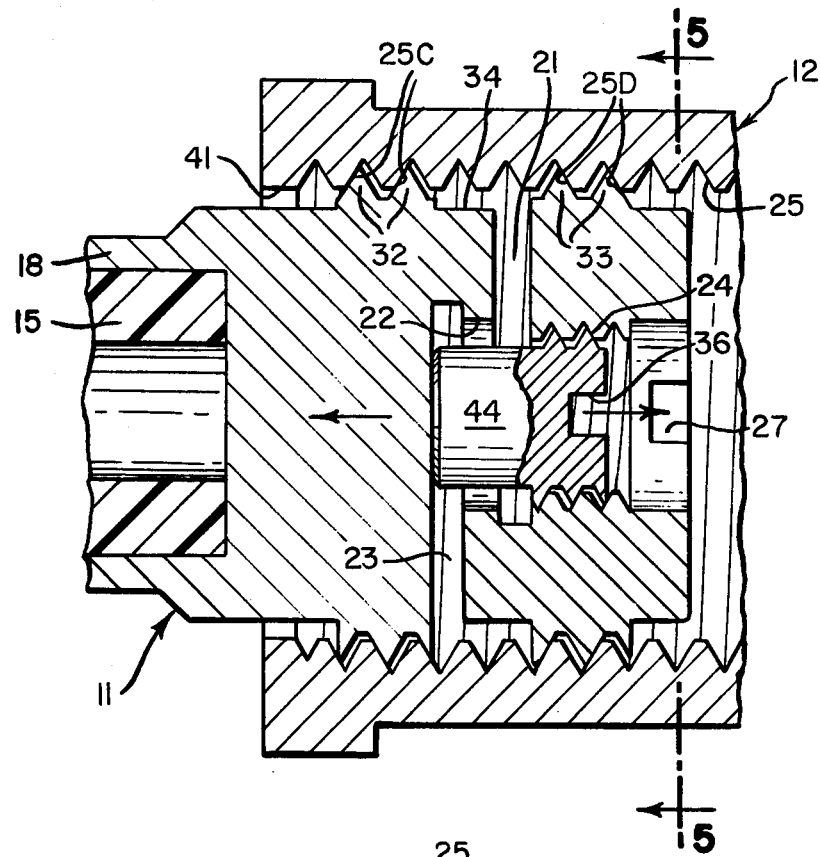
FIG. 4 is a greatly magnified cross-sectional view of another preferred embodiment of an adjustable low-loss capacitor embodying the principles of this invention.

FIG. 1 depicts an adjustable low-loss capacitor according to the principles of the invention. As shown, the capacitor comprises a stator unit designated generally as 10 and a rotor unit designated generally as 11. The rotor unit is threadedly mounted in a rotor bushing member designated generally as 12.

The stator unit 10 comprises a metal disc-shaped body portion 4 having an external integrally formed axial extention 5. The free end of extension 5 is headed at 6 for retaining a conductor (not shown) prior to and during the formation of a soldered connection with the conductor. The conductor, or other circuit element, which is connected to extension 5 provides a connection for energizing stator unit 10.

Stator unit 10 has an annular groove 29 formed therein which has a rectangular cross-section and is precisely concentric with the common longitudinal center axis of both stator unit 10 and rotor bushing 12. A cylindrical electrode 16, which resembles a short tube and is hereinafter referred to as the stator electrode, is precisely fitted in groove 29. Electrode 16 is permanently secured to the stator by, for example, a pressure fit or solder. The stator electrode is advantageously formed of Invar or a similar alloy whenever a low temperature co-efficient of capacitance is desired. When very low loss is important, electrode 16 is advantageously made of silver or any similar material which has a low resistivity. Electrode 16 may also be an integrally formed part of stator unit 10. An integrally formed cylindrical shank 17 extends from body portion 4 of stator unit 10 coaxially with the center axis of the capacitor.

Stator unit 10 is rigidly connected to rotor bushing 12 by hollow cylindrical insulating housing, or sleeve, 13, formed of a glazed ceramic material, such as alumina. Glass is also suitable. At each end of the housing, the external surface is metallized to provide a thin circumferential band 2 of metal which intimately and positively adheres to the surface of the sleeve. In FIG. 1, the thickness of each metallized band 2 has been exaggerated for clarity of illustration. One band is connected to the periphery of stator unit 10 and the other is connected to the periphery of rotor bushing 12. These connections are made through soldering, and, more particularly, by using a high melting point solder. During the soldering operation, the parts are so positioned that the center axes of stator unit 10 and rotor bushing 12 are precisely aligned.

Specifically, rotor unit 11 includes a cylindrical metal body portion having two axially spaced sections of external helical threads 32 and 33 which threadedly engage with complementary internal threads 25 formed in rotor bushing 12. These two threaded sections are separated by a non-threaded portion 34 having a reduced diamter. Rotor unit 11 also includes a cylindrical electrode 18—hereinafter referred to as the rotor electrode—formed of a metal similar to that of the stator electrode 16, as described above. Rotor electrode 18 is press fitted or otherwise permanently and accurately secured against the lateral wall of a cylindrical recess (not shown) formed in the inner end of rotor body 11. The end of the rotor unit, into which the rotor electrode is mounted, is hereinafter referred to as the electrode end. Inward movement of rotor unit 11 is limited by stop 41 which is formed in bushing 12 by discontinuing thread 25 just at the inner edge of the bushing.

Rotor electrode 18 may be moved axially with respect to stator electrode 16 by turning rotor unit 11 using a spanner wrench, as described hereinbelow, inserted in slots 27 and 31 (the latter shown in FIG. 3) which are formed in the outer end of the body of rotor unit 11. This end of the rotor unit is hereinafter referred to as the adjustment end.

To prevent rotor unit 11 from inadvertently turning and thereby changing the value of the capacitance produced by the adjustable capacitor, slots 21 and 23 are cut into the threaded section of rotor unit 11. At the time of manufacture, the threaded ends of rotor unit 11 are axially compressed to narrow these slots. This causes the flat vertical parallel walls of these slots to become slightly oblique with respect to each other. As a result, the threads on rotor unit 11 permanently become slightly misaligned, i.e., threads 32 become slightly helically misaligned with respect to threads 33. When threaded into engagement with internal threads 25 of rotor bushing 12, threads 32 and 33 on the rotor unit are resiliently brought back into helical alignment by web 22. As a result, a positive frictional force is applied between threads 32 and 33 on the rotor unit, and threads 25 on the rotor bushing. This force acts to prevent rotor unit 11 from being inadvertently turned. The adjustable capacitor thus far described is well known in the art and is in accordance with the teachings of U.S. Pat. No. 3,469,160 (issued Sept. 23, 1979 to J. E. Johanson) and reissued (on Sept. 16, 1980) as U.S. Pat. No. Re. 30,406, both of which are incorporated by reference herein.

While the above described adjustable capacitor works adequately well in most applications, the rotor may fail to maintain a preset position whenever the capacitor is subjected to a high shock force, e.g. approximately 25,000 g's. As a result, the capacitance is likely to deviate from a preselected value whenever a shock force of this magnitude is encountered. In fact, successive applications of this force may cause the actual value of capacitance to depart significantly from the preselected value. Forces of this magnitude are common in ballistic, aircraft and space applications and thus may render the above-described prior art capacitor unsuitable for use in these applications.

The present invention, therefore, is directed to an improved adjustable low-loss capacitor which maintains a substantially constant value of capacitance in operating environments in which the capacitor is subjected to high shock forces regardless of the direction from which these forces are applied. In accordance with the invention, this is achieved by inserting a threaded member, illustratively a screw, into a hole bored into the rotor body and, thereafter once the rotor is appropriately positioned, turning the screw which causes threaded surfaces of the rotor body to longitudinally compress or expand against corresponding mating thread surfaces of the rotor bushing. This motion produces a longitudinally directed expansive or compressive force which combines with the force produced by the slots cut into the rotor body. Once an appropriate point of expansion or compression is achieved, the rotor body frictionally locks against the rotor bushing and is thereby prevented from moving in any direction relative to the rotor bushing and stator unit.

As shown in FIG. 1, a hole is bored into rotor unit 11 substantially parallel to the center axis of the rotor. Threads 24 are then cut into the wall of this hole. A screw 14 of appropriate size—hereinafter referred to as locking screw 14—is threaded into the hole so that the threads of the screw precisely mate with threads 24. Locking screw 14 may be axially turned by means of slot 36 cut in the head of the screw which readily accommodates the end of an appropriately sized screwdriver blade. The head of the screw rests in an unthreaded counterbored hole in the rotor unit. The angled surface of the slotted head of the screw abuts against and slides along inclined surface 47 of the counterbored hole. This inclined surface may advantageously be a tapered shoulder.

For the arrangement thus far described, the electrode end of the rotor unit is unsupported. As such, whenever a shock pulse is applied to the capacitor in a transverse direction, the electrode end may oscillate briefly in a transverse direction, thereby causing transient capacitance changes. By inserting an insulated sleeve 15 between the inner rotor tube and the stator shank, this possibility is eliminated. Specifically, cylindrical insulating sleeve 15 is inserted between rotor electrode 18 and shank 17 and is held in place by peened edge 19. Sleeve 15 contacts shank 17 and thereby constrains the electrode end of the rotor from any transverse movement.

FIG. 2 shows a magnified cross-sectional view of rotor unit 11 and the surrounding structure of rotor bushing 12 and, more particularly, the orientation of locking screw 14 in rotor unit 11. Once rotor unit 11 has been inserted into rotor bushing 12 and turned (in a manner described hereinbelow) to assume a desired longitudinal, i.e., axial, position, locking screw 14 is then turned. Since the threads in locking screw 14 engage with the threads cut into the rotor unit near the electrode end, locking screw 14, as it is turned, imparts a longitudinally directed inward force—as depicted by the arrows shown in the figure—onto the electrode and adjustment ends of the rotor. This force is produced by the compressing threads of the rotor body reacting to the corresponding mating threads of the rotor bushing. Consequently, this force adds to the force produced by the slots cut into the rotor body. Thus, the pressure, i.e., frictional force, exerted by threads 32 and 33 of rotor unit 11 against thread surfaces 25A and 25B of rotor bushing 12 increases. Locking screw 14 is turned until the pressure exerted between these thread surfaces reaches a point sufficient to prevent any movement of rotor unit 11 in any direction within rotor bushing 12.

Locking screw 14 and rotor unit 11 can both be independently turned, i.e., adjusted, as shown in FIG. 3. This figure depicts a cross-sectional view taken along lines of 3—3 shown in FIG. 2. As shown in FIG. 3, locking screw 14 is located substantially along the center axis of rotor unit 11. Slot 36, as previously discussed, is cut into the head of the screw in order to accommodate a screwdriver blade which can be used to turn the screw. Two approximately rectangular slots 27 and 31 are cut into rotor unit 11. The slots are spaced sufficiently far apart and are sufficiently deep in order to accommodate each prong of an appropriately sized spanner wrench. If locking screw 14 has not been turned, i.e. the threads of the rotor unit have not been locked against those of the rotor bushing, then the position of the rotor unit can be readily changed by merely mating the spanner wrench to the rotor unit and turning it.

FIG. 4. depicts another preferred embodiment of an adjustable low-loss capacitor according to the principles of the invention. Since the structure of this capacitor is substantially similar to that shown in FIG. 1, in the interests of brevity, only the differences between these two capacitors will be discussed hereinbelow.

Specifically, a cylindrical member 44—hereinafter referred to as locking member 44—having adjustment slot 36 cut in one end and threads positioned near that end, is threaded into rotor unit 11 in lieu of locking screw 14 shown in FIG. 1. This adjustment slot is appropriately sized to accommodate the end of a screwdriver which can be used to axially turn the locking member.

After rotor unit 11 has been inserted into rotor bushing 12 and turned (in a manner described above) to assume a desired longitudinal, i.e. axial, position, locking member 44 is then turned. Since the threads on the surface of locking member 44 engage with the threads cut into the rotor unit near the adjustment end—in contrast with that shown in FIGS. 1 and 2—locking member 44, as it is turned, imparts a longitudinally directed outward force—as depicted by the arrows shown in the figure—onto the electrode and adjustment ends of the rotor unit. This force is produced by the expanding threads of the rotor body reacting to the corresponding mating threads of the rotor bushing. Consequently, this force combines with the force produced by the slots cut into the rotor body. Thus, the pressure exerted by threads 32 and 33 of rotor unit 11 against thread surfaces 25C and 25D increases. Locking member 44 is turned—in the same manner as locking screw 14 discussed above—until the pressure exerted between these threads reaches a point sufficient to prevent any movement of rotor unit 11 in any direction within rotor bushing 12.

Figure 5:
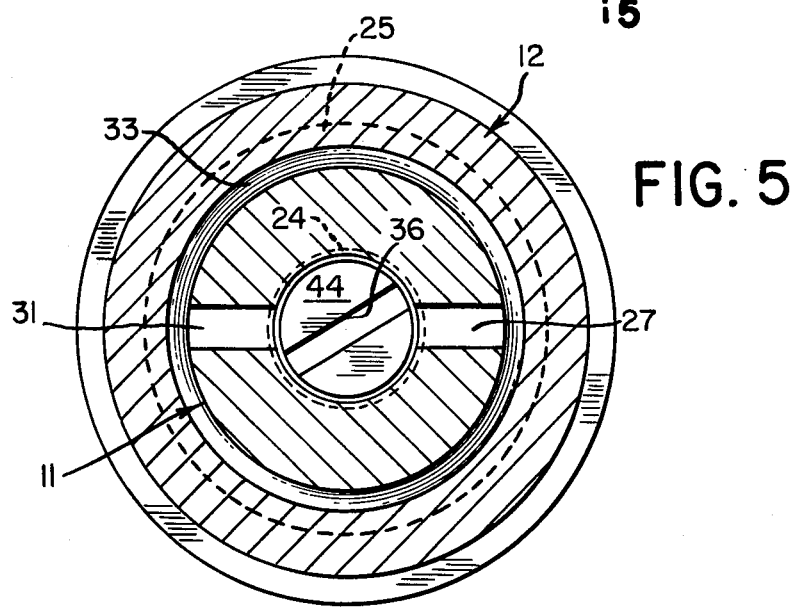
FIG. 5 is a reduced cross-sectional end view taken along lines 5—5, as shown in FIG. 4.

A reduced cross-sectional end view of the capacitor, shown in FIG. 4 and taken along lines 5—5, is shown in FIG. 5. The arrangement shown in this figure is highly similar to that shown in FIG. 3. Since the capacitor shown in FIGS. 4 and 5 is adjusted in an identical manner to that described for the capacitor shown in FIGS. 1, 2 and 3, the reader is referred to the text accompanying FIG. 3 for an explanation of how the capacitor shown in FIGS. 4 and 5 is adjusted.

As can be readily appreciated by those stated in the art, the concept of locking a rotor in a preselected position by inserting a threaded number into the rotor to increase the friction exerted between individual thread surfaces of the rotor against corresponding thread surfaces of a rotor bushing can be readily applied to any electronic component (not just capacitors) in which a threaded adjusting member is longitudinally, i.e., axially, moved within a threaded portion in a housing. Components of this type would illustratively contain a threaded adjustment slug, stub or screw and are exemplified by microwave tuning elements, intermediate frequency transformers and/or coils.

In addition, the threaded member, e.g., locking screw 14, need not be limited to a screw, but can instead be any object which, when inserted into the hole in the rotor unit, will adjustably compress or expand the threads of the rotor unit against those of the rotor bushing.

In addition, while the preferred embodiment has been described in terms of a stator unit and a rotor unit, each having only one cylindrical electrode, larger values of maximum capacitance can be readily produced by using multiple cylindrical electrodes coaxially arranged and connected in parallel for either or both the stator and rotor electrodes. Even larger values can be obtained by positioning corresponding dielectric members between one or more individual adjacent interleaved electrodes of the rotor and stator electrodes.

Although a specific illustrative embodiment has been shown and described herein, this merely illustrates the principles of the present invention. Many and varied arrangements embodying these principles may be devised by those skilled in the art without departing from the spirit and scope of the invention.

What is claimed is:

1. An electronic component having an adjustable value comprising:
   (a) a housing, having a threaded portion with a center axis, into which an adjusting member is threadedly inserted to vary the value, and
   (b) means inserted into said adjusting member for moving at least a first portion of said adjusting member in a longitudinal direction substantially parallel to the center axis of said threaded portion, with respect to a second portion of said adjusting member, whereby the position of said adjusting member is frictionally locked in any preselected position within said threaded portion.

2. The invention in claim 1 in which said moving means is further comprised of a threaded member which is inserted into said adjusting member in a direction substantially parallel to said center axis.

3. The invention in claim 2 wherein said adjusting member includes means for causing the pressure exerted between mating thread surfaces on said threaded portion and on said adjusting member to increase when said threaded member is threadedly inserted into said adjusting member.

4. The invention in claim 3 in which said causing means is further comprised of a plurality of slots each cut into a threaded end of said adjusting member and arranged substantially perpendicular to said center axis.

5. The invention in claim 4 in which said first portion of said adjusting member moves towards said second portion of said adjusting member whenever said threaded mumber is threadly inserted into said adjusting member to frictionally lock the adjusting member in said preselected position.

6. The invention in claim 5 in which said first portion of said adjusting member moves away from said second portion of said adjusting member whenever said threaded means are inserted into said adjusting member to frictionally lock said adjusting member into said preselected position.

7. An adjustable capacitor comprising
   (a) a stator unit, having a first set of electrodes comprised of at least one electrode, and a rotor unit having a center axis and having a second set of electrodes comprised of at least one electrode, wherein each electrode of said second set is arranged substantially parallel to each electrode of said first set and is separated from each electrode in said first set and is adapted to move in a predetermined relationship with respect to a corresponding electrode of said first set to vary the capacitance value of said variable capacitor, and
   (b) means inserted into said rotor unit for moving at least a first portion of said rotor unit in a longitudinal direction substantially parallel to said center axis with respect to a second portion of said rotor unit whereby the position of said second set of electrodes is frictionally locked relative to that of the first set.

8. The invention in claim 7 in which said moving means is further comprised of a threaded member which is inserted into said rotor unit in a direction substantially parallel to said center axis.

9. The invention in claim 8 in which said adjustable capacitor is further comprised of:
   (a) said first and second sets of electrodes, in which at least one of said electrodes in said first and second sets is a cylindrical conductor coaxially arranged with at least one of the remaining ones of said first and second sets, respectively,
   (b) an electrically conductive body portion mounting said first set of electrodes,
   (c) a cylindrical electrically insulating housing surrounding said first set of electrodes and attached to one end of said body,
   (d) a hollow cylindrical electrically conductive bushing having an outer diameter substantially equal to that of said housing and having one circular end coupled to said housing, the hollow center of said bushing being threaded and having a diameter substantially equal to that of the inner walls of said housing, and
   (e) said rotor unit further comprised of a generally cylindrical rotor body, having a threaded outer surface with threads capable of engaging with the threads of said bushing for facilitating axial movement of said rotor body within said bushing, and said second set of electrodes coupled at one circular end of said rotor body.

10. The invention in claim 9 wherein said rotor unit includes means for causing the pressure exerted between corresponding mating thread surfaces on said bushing to increase when said threaded member is inserted into said rotor unit to lock said rotor unit in a preselected position within said bushing.

11. The invention in claim 10 in which said causing means is further comprised of a plurality of slots each cut into a threaded end of said rotor body and arranged substantially perpendicular to said center axis.

12. The invention in claim 11 in which said first portion of said rotor unit moves towards said second portion of said rotor unit whenever said threaded means are inserted into said rotor unit to frictionally lock the rotor unit into said preselected position within said bushing.

13. The invention in claim 11 in which said first portion of said rotor unit moves away from said second portion of said rotor unit whenever said threaded means are inserted into said rotor unit to frictionally lock said rotor unit into said preselected position.

14. The invention in claims 12 or 13 in which said capacitor is further comprised of an insulated sleeve mounted to one of said second set of electrodes.

15. In an adjustable capacitor having a stator unit and a rotor unit, said rotor unit having a center axis and being adapted to move in a predetermined relationship with respect to said stator unit to vary the capacitance value of said variable capacitor, means inserted into said rotor unit for moving at least a first portion of said rotor unit in a longitudinal direction substantially parallel to said center axis with respect to a second portion of said rotor unit whereby the position of the rotor unit is frictionally locked relative to that of the stator unit.

16. The invention in claim 15 in which said moving means is further comprised of a threaded member which is inserted into said rotor unit in a direction substantially parallel to said center axis.

17. The invention in claim 16 in which said adjustable capacitor is further comprised of:
   (a) first and second sets of electrodes, in which at least one of said electrodes in said first and second sets is a cylindrical conductor coaxially arranged with at least one of the remaining ones of said first and second sets, respectively,
   (b) an electrically conductive body portion mounting said first set of electrodes,
   (c) a cylindrical electrically insulating housing surrounding said first set of electrodes and attached to one end of said body,
   (d) a hollow cylindrical electrically conductive bushing having an outer diameter substantially equal to that of said housing and having one circular end coupled to said housing, the hollow center of said bushing being threaded and having a diameter substantially equal to that of the inner walls of said housing, and
   (e) said rotor unit further comprised of a generally cylindrical rotor body, having a threaded outer surface with threads capable of engaging with the threads of said bushing for facilitating axial movement of said rotor body within said bushing, and said second set of electrodes coupled at one circular end of said rotor body.

18. The invention in claim 17 wherein said rotor unit includes means for causing the pressure exerted between corresponding mating thread surfaces on said rotor body and on said bushing to increase when said threaded member is inserted into said rotor unit to lock said rotor unit in a preselected position within said bushing.

19. The invention in claim 18 in which said causing means is further comprised of a plurality of slots each cut into a threaded end of said rotor body and arranged substantially perpendicular to said center axis.

20. The invention in claim 19 in which said first portion of said rotor unit moves toward said second portion of said rotor unit whenever said threaded means are inserted into said rotor unit to frictionally lock the rotor unit into said preselected position.

21. The invention in claim 19 in which said first portion of said rotor unit moves away from said second portion of said rotor unit whenever said threaded means are inserted into said rotor unit to frictionally lock said rotor unit into said preselected position.

22. The invention in claims 20 or 21 in which said capacitor is further comprised of an insulated sleeve mounted to one of said second set of electrodes.

23. An adjustable capacitor comprised of:
   (a) first and second sets of electrodes, in which at least one of said electrodes in said first and second sets is a cylindrical conductor coaxially arranged with at least one of the remaining ones of said first and second sets, respectively,
   (b) an electrically conductive body portion mounting said first set of electrodes,
   (c) a cylindrical electrically insulating housing surrounding said first set of electrodes and attached to one end of said body,
   (d) a hollow cylindrical electrically conductive bushing having an outer diameter substantially equal to that of said housing and having one circular end coupled to said housing, the hollow center of said bushing being threaded and having a diameter substantially equal to that of the inner walls of said housing,
   (e) a generally cylindrical rotor body, having a center axis and a threaded outer surface with threads capable of engaging with threads of said bushing for facilitating axial movement of said rotor body within said bushing, and said second set of electrodes coupled at one circular end of said rotor body, and
   (f) a threaded member inserted into a hole formed in said rotor body for moving at least a first portion of said rotor body in a longitudinal direction substantially parallel to said center axis with respect to a second portion of said rotor body whereby the position of the rotor body is frictionally locked within said bushing.

24. The invention in claim 23 in which said hole is oriented in said rotor body in a direction substantially parallel to said center axis.

25. The invention of claim 24 in which said rotor body is further comprised of a plurality of slots each cut into a threaded end of said rotor body and arranged substantially perpendicular to said center axis.

* * * * *

UNITED STATES PATENT AND TRADEMARK OFFICE
CERTIFICATE OF CORRECTION

PATENT NO. : 4,464,699
DATED : August 7, 1984
INVENTOR(S) : Arthur Bunce et al.

It is certified that error appears in the above—identified patent and that said Letters Patent is hereby corrected as shown below:

Column 3, line 17, "extention" should read --extension--;

Column 3, line 63, "diamter" should read --diameter--;

Column 6, line 50, "stated" should read --skilled--;

Column 6, line 52, "number" should read --member--;

Column 7, line 48, "mumber" should read --member--;

Column 7, line 48, "threadly" should read --threadedly--;

Signed and Sealed this

Fifth Day of February 1985

[SEAL]

Attest:

DONALD J. QUIGG

Attesting Officer    Acting Commissioner of Patents and Trademarks